United States Patent [19]

Midland et al.

[11] Patent Number: 4,706,116

[45] Date of Patent: Nov. 10, 1987

[54] WIDE BAND BEAM INDEX SYSTEM WITH IMPROVED BRIGHTNESS

[75] Inventors: Richard W. Midland, Inverness; Boris Rozansky, Skokie, both of Ill.

[73] Assignee: Zenith Electronics Corporation, Glenview, Ill.

[21] Appl. No.: 916,572

[22] Filed: Oct. 8, 1986

[51] Int. Cl.⁴ .............................................. H04N 9/24
[52] U.S. Cl. ......................................... 358/67; 358/69
[58] Field of Search ............................. 358/67, 69, 70

[56] References Cited

U.S. PATENT DOCUMENTS

| | | | |
|---|---|---|---|
| 4,194,140 | 3/1980 | Hamano et al. ................... | 358/69 X |
| 4,408,223 | 10/1983 | Midland ................................. | 358/67 |
| 4,468,690 | 8/1984 | Midland ................................. | 358/67 |
| 4,527,192 | 7/1985 | Midland et al. ....................... | 358/67 |
| 4,628,349 | 12/1986 | Midland ................................. | 358/67 |
| 4,651,197 | 3/1987 | Midland ................................. | 358/69 |
| 4,658,288 | 4/1987 | Midland et al. ....................... | 358/67 |

*Primary Examiner*—James J. Groody
*Assistant Examiner*—E. Anne Faris

[57] ABSTRACT

A wide band single beam index signal system where the electron beam is operated earlier when positioned to strike an index strip in the presence of video signal corresponding to an immediately prior phosphor stripe and extended when positioned to strike an index strip in the presence of a video signal corresponding to an immediately following phosphor stripe.

5 Claims, 3 Drawing Figures

WIDE BAND BEAM INDEX SYSTEM WITH IMPROVED BRIGHTNESS

CROSS REFERENCE TO RELATED PATENTS AND PATENT APPLICATION

This application is related to U.S. Pat. No. 4,527,192 issued Jul. 2, 1985 in the names of Richard W. Midland and Boris Rozansky and entitled "INDEX SIGNAL ENHANCEMENT CIRCUIT" and apparatus disclosed and claimed in copending applications Ser. No. 738,797, filed May 28, 1985, entitled "BEAM INDEX SYSTEM HAVING TWO DISTINCT LEVELS OF INDEX VIDEO SIGNAL" and Ser. No. 721,721, filed Apr. 9, 1985, entitled "VIDEO-INDEX SIGNAL MIXER", both in the name of Richard W. Midland, all of which are assigned to Zenith Electronics Corporation.

BACKGROUND OF THE INVENTION AND PRIOR ART

This invention concerns index color cathode ray tubes (CRTs) and, specifically, wide band index tube systems. The high resolution capability of the single beam index CRT is well known, and it has demonstrated great potential for widespread use in color monitors for computer terminals.

A conventional single beam index CRT includes a faceplate having a pattern of vertically oriented stripes of different colored light emitting phosphors on its inner surface, with each phosphor stripe being separated from its neighboring phosphor stripe by a guard band of inert material, that is, material that does not emit visible light under electron bombardment. The guard band enables selective energization of the different colored light emitting phosphors by a single electron beam and permits a larger electron beam for maximizing the brightness of the CRT. The phosphor stripes are arranged in a regular pattern interspersed with special signal areas, disposed at regular intervals on the screen, for generating index pulses in response to impingement by the scanned electron beam. The special signal areas may comprise narrow strips of energy emissive material overlying an aluminized layer deposited on the rear surface of the screen, that is, the surface closest to the electron gun. The energy emissive material, which may be a conventional monochrome phosphor such as type P47, produces ultraviolet light in response to electron bombardment that is directed toward the back of the CRT where it is sensed by a photo multiplier tube (PMT) positioned outside of and to the rear of the CRT envelope. The aluminized layer prevents visible light that may be emitted from the index strips from reaching the front of the tube. As the electron beam is deflected across the phosphor screen, the pulses of energy emitted by the index strips are detected by the PMT and processed by suitable circuitry to form an index signal.

Beam index CRT systems may be generally categorized as narrow band and wide band. In the more common narrow band system, the electron beam video excitation frequency is relatively fixed throughout each scanning line or beam traversal across the CRT screen, with only minor adjustments in phase being made. The narrow band system has the advantage of noise immunity and, consequently, can be operated with very low index strip excitation levels. Its disadvantage is that only relatively minor variations in time spacing between index strips can be compensated for. The result is often very poor color purity.

In a wide band index system, video excitation is controlled on a strip-by-strip basis, which automatically compensates for variations in timing of the index strips. Examples of wide band index systems are U.S. Pat. Nos. 4,408,223 and 4,468,690. Wide band systems afford very close control over the beam and can yield improved efficiency due to the precision with which the beam position is known. The major disadvantage of a wide band system is its susceptibility to noise. Thus, the excitation level of the index strips must generally be greater to produce an acceptable signal-to-noise ratio. The high index strip excitation adversely impacts the no video "blackness" of the tube and the contrast of the display. A technique for maintaining these characteristics is to turn the electron beam off between index strips, in the absence of video information. As discussed in copending application Ser. No. 738,797, a multi-level index signal is employed, with the electron beam being operated at a low level when positioned to impact an index strip, in the absence of video information, and at a higher level when positioned to impact a video strip in the presence of video information. This characteristic, in conjunction with turning the electron beam off between index strips under no-video conditions, enhances the contrast and purity of the display.

The above-mentioned patent addresses a difficulty that affects the brightness capability of an index tube. Under video conditions, the electron beam may impinge an index strip in addition to a color phosphor stripe. This occurs particularly under electron bombardment of the color stripes immediately adjacent to an index strip and imposes limits on the relative sizes of the index strip, guard bands, video stripes and electron beam. In the patent, the video signals corresponding to the color stripes on each side of the index strips are sensed. Correction means produce opposite polarity pulse signals that are added to the PMT output which corrects the developed index signal by offsetting the effects of adjacent video stripe excitation on the index strip. Under "heavy" video conditions, the index strip can still be found.

Rather than adding counteracting signals to the PMT output that is supplied to the index signal developing circuits, the present invention modifies the duration of the index video drive signal and incorporates closer location of increased amplitude video excitation drive signals adjacent each side of an index strip, respectively, to permit greater video excitation and achieve more brightness. Thus in the preferred embodiment of the invention, the video drive signals for the color phosphor stripes immediately adjacent the index strips are able to be tailored, i.e., increased in amplitude and moved closer to the index strip, relative to previous systems, because the index strip excitation level is high enough to permit the index signal to be accurately produced despite spillover from the adjacent color video drive signals. Further, the tailoring is such that a minimum amount of undesirable video index signal spillover onto adjacent unilluminated phosphor stripes occurs to avoid color contamination.

OBJECTS OF THE INVENTION

A principal object of the invention is to provide a novel, wide band single beam index CRT system.

Another object of the invention is to provide a wide band single beam CRT index system with enhanced brightness and index signal response.

BRIEF DESCRIPTION OF THE DRAWINGS

Further objects and advantages of the invention will be apparent upon reading the following description in conjunction with the drawings in which.

DESCRIPTION OF THE PREFERRED EMBODIMENT

Figure 1:
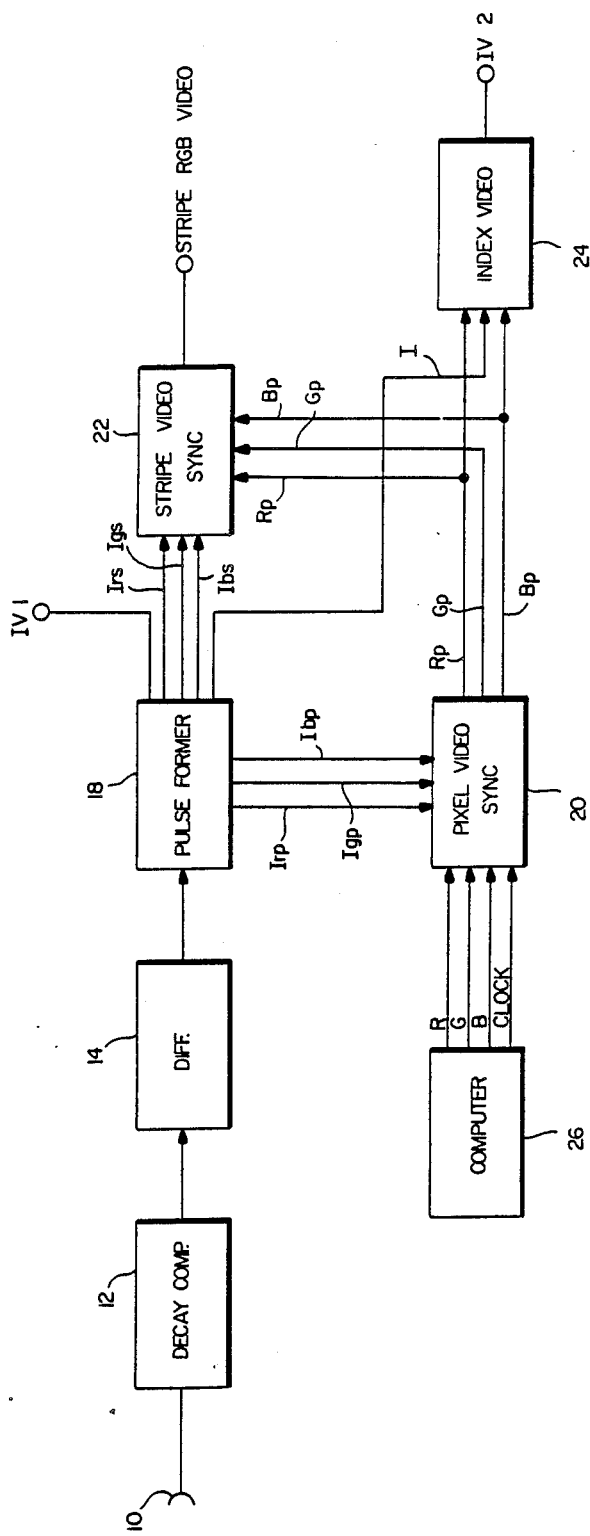
FIG. 1 represents a simplified block diagram of the system of the invention.

Referring to FIG. 1, a PMT 10 is coupled to a decay compensation circuit 12 that supplies a differentiation circuit 14. The output of differentiation circuit 14 is coupled to a pulse former circuit 18 which supplies index pixel signals Irp, Igp, Ibp to a pixel video sync circuit 20, index strip signals Irs, Igs, Ibs to a stripe video sync circuit 22, an index signal I to an index video circuit 24 and an index signal IV1. The pixel video sync circuit 20 has red (R), green (G) and blue (B) video color inputs and a pixel clock signal input from a computer 26. The Rp, Gp, Bp outputs of pixel video sync circuit 20 are supplied to stripe video sync circuit 22. The Rp and Bp outputs are also supplied to index video circuit 24. The output of circuit 22 consists of serial RGB stripe video data. An IV1 pulse is generated whenever the electron beam is in position to strike an index strip on the CRT screen. The output of circuit 24 consists of index video pulses IV2 which are produced when the electron beam is in position to strike an index strip on the CRT screen, during occurrence of the selected red and blue video information, as will be explained hereinafter.

The circuitry for turning off the electron beam in the CRT between index strips is omitted for the sake of clarity. The arrangement and functioning of such circuitry is fully described in one or more of the above-mentioned patents. It will be understood that such circuitry may be used with the present invention and to the extent necessary the applicable disclosures of the above patents are hereby incorporated by reference.

The present circuit differs from the above-referenced patents and copending applications in that the peak amplitudes of the video drive currents for the electron beam may be larger and the index video signal IV2 is altered to maximize brightness at the expense of electron spillover. However, the spillover increase occurs during the altered index video signal IV2 and little adverse effect results. The index video signal IV2 is started earlier, and maintained longer, in the presence of both adjacent video signals to enhance index signal recognition. In the copending application Ser. No. 738,797, in the presence of color video data, an IV2 video pulse is used to increase the drive to G1 of the CRT. In the present invention, the IV2 video pulse is started earlier in the presence of video data of one color and started later in the presence of video data of another color, and in the presence of video data of both colors may have a greater duration.

The index pixel signal gates or "clocks" the RGB pixel data from the pixel video sync circuit 20. Consequently, the presence or absence of the selected color video data is readily ascertained. The index signal also controls stripe video sync circuit 22 and index video circuit 24 for producing the appropriate RGB video data, the IV1 index video signal and the IV2 index video signal. The IV1 and IV2 index video signals, in this invention, are switch signals that control drive voltages for the CRT.

Figure 2:
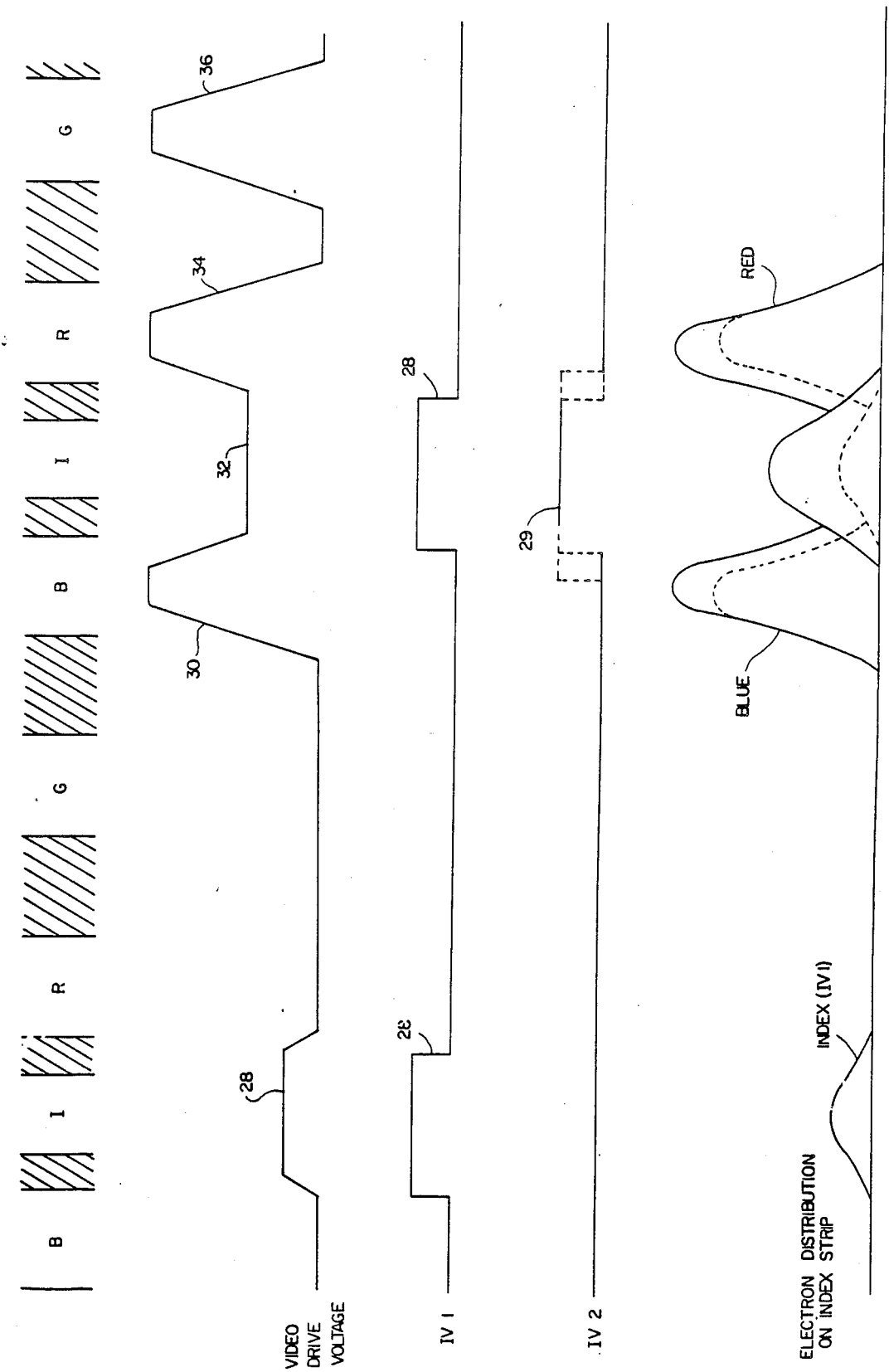
FIG. 2 is a series of waveforms illustrating operation of the invention.

Across the top of FIG. 2 is a schematic representation of a portion of the CRT phosphor screen with R, G, B and I representing red, green and blue color phosphor stripes and index strips, respectively. The shaded areas indicate the black inert guard band material. Commencing from the left, there is in succession: a stripe of blue colored light emitting phosphor material; a wider stripe of inert guard band material, over which is deposited a strip of index material I; a stripe of red light emitting phosphor material; a stripe of inert guard band material; a stripe of green light emitting phosphor material, etc. The pattern is repeated horizontally across the width of the CRT screen and extends vertically down the full height of the CRT screen.

A simplified composite video drive voltage signal is illustrated directly beneath the screen portion and beginning at the left includes: a low level drive signal 28 corresponding to the IV1 index video pulse; a zero level signal corresponding to the time that the electron beam is positioned over the subsequent red and green phosphor stripes (and the guard band stripes); a large magnitude signal 30 corresponding to a blue video signal; an intermediate magnitude signal 32 corresponding to the IV2 index video signal; a large magnitude red video signal 34; a zero level signal corresponding to the next stripe of inert material; and a large magnitude green video signal 36. The video drive voltage signal is thus: at zero level—in the absence of video when the electron beam is in position to strike other than an index strip and its corresponding guard band; is at the low level—in the absence of video when the beam is in position to strike an index strip; is at the intermediate level—in the presence of red and/or blue video data when the electron beam is in position to strike an index strip; and is at the large magnitude level when the electron beam is in position to strike a red, green or blue color stripe. This video drive signal is somewhat similar to that shown in the above-mentioned copending application Ser. No. 738,797, which represents a more idealized condition, except for the magnitudes and the degree of overlap of the index video drive voltages.

Drive signal 32 is a result of signal 29, that is IV2. In practice, drive signal 32 is formed by the mixing of the drive signal voltages for the color stripes and for the index strip. It will be remembered that IV1 and IV2 are switching signals and their resultant drive voltages are not proportionally related. Specifically, IV2 controls a much larger drive voltage than IV1. The waveforms at the bottom of FIG. 2 illustrate, in an idealized manner, electron distributions as seen by the index strip for the various drive signals and are seen to be generally bell-shaped curves. The curve of electron distribution for the IV1 index signal has a much smaller amplitude than that for the IV2 index signal. The solid line blue and red distribution curves are closer to the index signal curve and of larger amplitude than their dashed line counterparts, which generally indicate the prior circuit design. Electron spillover in the vicinity of the index strip is increased because the large magnitude blue video drive voltage creates an electron distribution pattern that tends to overlap onto the index strip. Similarly, the red video drive signal may be advanced or applied earlier than in the prior art, and because of its large magnitude, results in approximately the same distribution patterns at the right side of the index strip. The increased number of spillover electrons (the difference between the dashed line curves and the solid line curves) in the vicinity of the index strip are more than offset by the index signal being significantly greater in magnitude, and the overall effect on the blue and red color output of the CRT is very beneficial because of the larger drive voltages that may be used. Further, the index signal is extended in duration. There are substantially no spillover electrons from excitation of the green color strip seen by the index strip.

It will be appreciated by those skilled in the art that FIG. 2 illustrates tailoring of the blue video drive voltage signal and the red video drive voltage signal in an index tube having a screen construction with the indicated arrangement of color stripes. Significant benefits from the invention may be obtained by tailoring only one of the adjacent color drive signals. The key is that when blue or red video is known to be present, the index drive signal may be fashioned to enhance index signal detection and permit even greater excitation of the blue and red color stripes.

Figure 3:
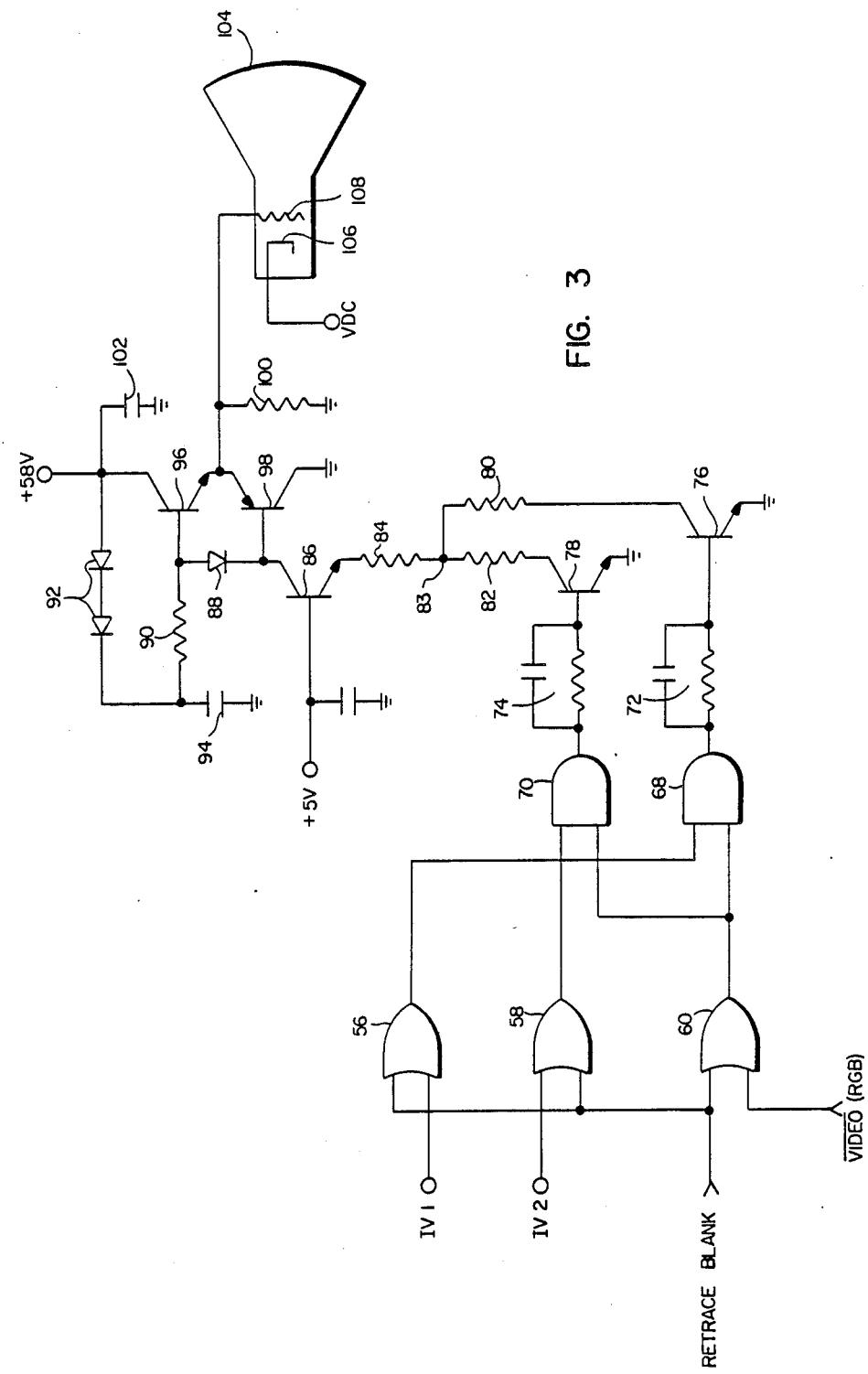
FIG. 3 is a partial schematic diagram of a preferred circuit implementation of the invention.

In FIG. 1, the R and B pixel video sync signals were applied to index video processor 24, where the IV2 signal is tailored in the presence of R and B video. In FIG. 3, IV2, IV1 and RGB video are applied to a plurality of OR gates. It will be appreciated that the video drive signal voltage generating circuits (not shown) respond to the computer output pulses to develop the R, G and B drive signals and that the signal corresponding to red is delayed to produce the video drive waveforms illustrated in FIG. 2. The actual amount of the delay is a function of the scanning speed and screen construction, and its determination is well within the abilities of one skilled in the art. In the embodiment under discussion, with a CRT 7.2 inches wide and a stripe pattern of 0.003 inches, with index strip and associated inert material of 0.003 inches, a delay of 0.005 microseconds has been found to yield significantly beneficial results.

As mentioned, video information in the form of R, G and B data may be supplied from the output of a microprocessor controlled character generator or from a memory. Blanking information is derived from a conventional horizontal and vertical retrace blank signal. The retrace blank signal is applied to each input of the three OR gates 56, 58 and 60 for turning off the electron beam during retrace. ORs 56 and 58 each have their other inputs connected to receive IV1 and IV2, respectively. The other input of OR 60 is connected to receive a video signal. The output of OR 56 is connected to an input of an AND gate 68, the output of OR 58 is connected to the input of an AND gate 70, and the output of OR 60 is connected to both of the remaining inputs of ANDs 68 and 70. The outputs of ANDs 68 and 70 are connected through RC networks 72 and 74 to the base electrodes of a pair of switch transistors 76 and 78, respectively. Transistors 76 and 78 are coupled through respective load resistors 80 and 82 to a junction 83 which is in series with the emitter-collector circuit of a transistor 86. Specifically, transistor 86 has its emitter connected to junction 83 through a resistor 84 and its collector connected through a diode 88 and a resistor 90 to a +58 volt source. A pair of diodes 92 is connected between the voltage source and resistor 90 for establishing an offset voltage. A filter capacitor 94 is connected from resistor 90 to ground and a filter capacitor 102 is connected from +58 volts to ground. A pair of push-pull connected video transistors 96 and 98 are serially connected between +58 volts and ground. The junction of the emitters of transistors 96 and 98 is connected to G1, that is, grid element 108 in a CRT 104 and across a resistor 100 to ground. A cathode element 106 is connected to a source of DC voltage for CRT 104. Load resistor 80 is larger in magnitude than load resistor 82 which enables the IV2-controlled drive voltage signal to be greater than the IV1-controlled drive voltage signal developed at grid 108.

Transistor 86 is a video switching transistor, the base of which is supplied with a +5 volt reference potential. Transistors 76 and 78 are connected in a cascode circuit with transistor 86 which drives the push-pull emitter follower connection of transistors 96 and 98. This particular arrangement of driving circuitry is fully disclosed and claimed in copending application Ser. No. 721,721 and does not constitute part of the present invention. Suffice it to say that with the circuit arrangement, the CRT beam is either ON, OFF, or at a low level which permits use of a switching video amplifier-mixer rather than a linear arrangement. The result is that fast switching, low power handling, off-the-shelf transistors may be used since they are quickly driven from cutoff to saturation and thereby experience minimal power dissipation.

With the circuit configuration illustrated, and the appropriately shaped data pulses corresponding to blue and red color information, the drive voltages illustrated in FIG. 2 are achievable with the advantages that the tube's brightness capability is enhanced while retaining the index video signal signal-to-noise ratio. As mentioned, one or more of the features may be used with additive beneficial effects and the invention is to be limited only as defined in the claims.

What is claimed is:

1. In a wide band beam index CRT system of the type including a CRT having a single electron beam and a viewing screen formed of a pattern of groups of different colored light emitting phosphor stripes with individual stripes being separated by guard bands of inert material, index strips disposed on the obverse side of certain of said guard bands, and means for developing an index signal for controlling the application of different color video data to said CRT coincident with the electron beam in said CRT being in position to strike different color phosphor stripes, said CRT having a given stripe brightness capability with a given signal to noise ratio for said index signal, the improvement comprising:

means for modifying operation of said electron beam when positioned to strike an index strip in the presence of color video data corresponding to color phosphor stripes adjacent an index strip for increasing the brightness capability of said stripes without degrading the signal-to-noise ratio of the index signal.

2. The system of claim 1 wherein said modifying means comprise means for advancing said index signal in the presence of color video data corresponding to a color phosphor stripe immediately prior to an index strip.

3. The system of claim 2, further including means for extending said index signal in the presence of color video data corresponding to a color phosphor stripe immediately following an index strip.

4. The system of claim 3, further including means for operating said electron beam at a first level when in position to strike an index strip and for turning said electron beam off between index strips, in the absence of color video data, and further including means for increasing said electron beam from said first level to a second level when positioned to strike an index strip in the presence of color video data corresponding to a color phosphor stripe positioned immediately adjacent an index strip.

5. A wide band beam index system including a CRT having a viewing screen formed of a pattern of groups of different colored light emitting phosphor stripes with individual color stripes being separated by guard bands of inert material and index strips disposed on the obverse side of certain of said guard bands, said CRT having a single electron beam, and means for developing an index signal for controlling the application of color video data to said CRT as the electron beam in said CRT is positioned to strike different colored light emitting color phosphor stripes comprising:

first means for generating a first index video signal for driving said electron beam at a first level when positioned to strike an index strip, in the absence of color video data;

second means for generating a second index video signal for driving said electron beam at a second, higher level when positioned to strike an index strip during occurrence of color video data corresponding to a color phosphor stripe positioned immediately adjacent to an index strip;

means for turning off said electron beam between index strips in the absence of color video data; and means for operating said electron beam earlier and later in time when substantially positioned to strike an index strip in the presence of color video data corresponding to adjacent color phosphor stripes immediately before and after said index strip.

* * * * *